US007753282B2

(12) United States Patent
Kojima (10) Patent No.: US 7,753,282 B2
(45) Date of Patent: Jul. 13, 2010

(54) MOBILE COMMUNICATION TERMINAL AND PROGRAM THEREFOR

(75) Inventor: Tomosaburo Kojima, Tokyo (JP)

(73) Assignee: Techfirm Inc., Tokyo (JP)

( * ) Notice: Subject to any disclaimer, the term of this patent is extended or adjusted under 35 U.S.C. 154(b) by 809 days.

(21) Appl. No.: 11/706,178

(22) Filed: Feb. 12, 2007

(65) Prior Publication Data

US 2007/0138282 A1    Jun. 21, 2007

(51) Int. Cl.
*G06K 19/06* (2006.01)
(52) U.S. Cl. .................. 235/492; 235/451; 235/441; 235/380
(58) Field of Classification Search .......... 235/492, 235/380, 487, 451, 441
See application file for complete search history.

(56) References Cited

U.S. PATENT DOCUMENTS

2004/0256455 A1* 12/2004 Fukushima et al. ......... 235/382

FOREIGN PATENT DOCUMENTS

| JP | 2002-298169 | 10/2002 |
|----|-------------|---------|
| JP | 2002-344377 | 11/2002 |
| JP | 2003-58453  | 2/2003  |
| JP | 2003-91701  | 3/2003  |
| JP | 2004-220590 | 8/2004  |
| JP | 2004-235643 | 8/2004  |

OTHER PUBLICATIONS

International Search Report dated Oct. 25, 2005.
I mode starts FeliCa service-Srart Osaifu-ketai Jun. 16, 2004 by NTT DoCoMo, Inc. (2 pages).
English Language Summary of I mode starts FeliCa service-Srart Osaifu-ketai Jun. 16, 2004 by NTT DoCoMo, Inc. (1 page).
Office Action for related application No. GB0703989.4 issued on Sep. 25, 2008. (2 pages).

* cited by examiner

*Primary Examiner*—Edwyn Labaze
(74) *Attorney, Agent, or Firm*—Nutter McClennen & Fish LLP; John J. Penny, Jr.

(57) ABSTRACT

A mobile communication terminal being capable of holding various contents and immediately using a desired service regardless of the volume of data of the noncontact IC is provided. The mobile communication terminal includes a noncontact IC being capable of reading/writing a content directly from an external reader/writer and a terminal body that holds the noncontact IC. The terminal body includes: a main body processor that controls an operation of the terminal body and reads/writes the content stored in the noncontact IC; a display section that displays the content stored in the noncontact IC; an operation section that receives a selection of the content displayed on the display section; and a main body memory that stores therein data processed by the main body processor. The main body processor saves the content selected by the operation section among the contents displayed on the display section from the noncontact IC to the main body memory, and writes the saved content back to the noncontact IC when a predetermined condition is satisfied.

25 Claims, 6 Drawing Sheets

| DATA ITEMS | DATA |
|---|---|
| KIND OF CONTENT | MEMBER'S CARD |
| SERVICE CODE | AE0103 |
| COMPANY NAME | XX PUB |
| STORE NAME | SHIBUYA STORE |
| MEMBERSHIP NUMBER | 1234567 |
| EXPIRATION DATE | 2004/8/30 |
| CONTENT CODE | 98765 |
| SIZE OF DATA | ○○ byte |

MOBILE COMMUNICATION TERMINAL AND PROGRAM THEREFOR

BACKGROUND

1. Field of the Invention

The present invention relates to a mobile communication terminal and a program. Particularly, the present invention relates to a mobile communication terminal including a noncontact IC being capable of directly reading/writing data to/from external reader/writer and a terminal body holding the noncontact IC, and a program therefore.

The present application relates to and claims priority from a Japanese Patent Application No. 2004-235643 filed in Japan on Aug. 12, 2004, the contents of which are incorporated herein by reference for all purpose if applicable in the designated state.

2. Field of the Invention

Generally, a technology for servicing to provide the settlement on transport facilities, electronic money and personal identification by using a cellular phone including therein a noncontact IC card has been known as, for example in Japanese Patent Application Publication No. 2002-298169, and "I mode starts FeliCa service-Srart Osaifu-ketai™ on Jun. 16, 2004 by NTT DoCoMo, Inc. retrieved on Jul. 1st, 2004 http://www.nttdocomo.co.jp/new/contents/04/whatnew0616.html>

The IC card can hold a plural kinds of data such as commuter pass data and electronic money at a time. However, since the volume of data is limited, there is a problem that the number and the kind of contents which can be stored in the IC card are limited dependent on the volume of data of the IC card. For example, when it is necessary to have a plurality of member's cards, or when the member's cards are different for each store in a franchise chain, it is assumed the case that the content to be stored in the IC card is different from each other. In this case, there has been a problem that the content applicable to all the available store can not be stored in the IC card at a time because of limiting the volume of memory of the IC card. Additionally, when a plural kinds of thicket data of concerts and movies are previously purchased and held in stored in the IC card, the plurality of contents which are not used up to the day are also stored in the IC card, so that the volume of the IC card is wasted.

SUMMARY

In order to solve the above described problems, a first aspect of the present invention provides a mobile communication terminal. The mobile communication terminal includes: a noncontact IC being capable of reading/writing to/from external reader and writer, and a terminal body that holds the noncontact IC. The terminal body includes: a main body processor that controls an operation of the terminal body and reads/writes the content stored in the noncontact IC; a display section that displays the content stored in the noncontact IC an operation section that receives a selection of the content displayed on the display section; and a main body memory that stores therein data processed by the main body processor. The main body processor saves the content selected by the operation section among the contents displayed on the display section from the noncontact IC to the main body memory, and writes the saved content back to the noncontact IC when a predetermined condition is satisfied. Thereby various contents can be held in the mobile communication terminal regardless of the volume of data of the noncontact IC. Additionally, a desired service can be immediately used by switching the memory location of the contents between the noncontact IC and the memory for the main body.

The main body processor stores an index of the content stored in the noncontact IC in the main body memory in association with each content. The display section displays the index for each content stored in the main body memory. The main body processor, when any index is selected by the operation section, judges that the content stored in the main body memory in association with the selected index is selected.

The main body processor stores a copy of the content stored in the noncontact IC in the main body memory. The display section displays the copy of the content stored in the main body memory as the content stored in the noncontact IC. The main body processor, when any copy of the contents displayed on the display section is selected as the content to be saved from the noncontact IC to the main body memory, saves the content by deleting the content which is the original of the copy stored in the noncontact IC from the noncontact IC while the selected copy is stored in the main body memory.

Receiving a request for writing the content, the main body processor judges whether a free space of the noncontact IC is not enough to store the contact which has been required to be written, and judging that the free space of the noncontact IC is not enough to store the content which has been required to be written, the main body processor saves the content stored in the noncontact IC to the main body memory until the free space of the noncontact IC is more than the size of the content to be written. Thereby the free space required to write a new content can be surely obtained without considering the free space of the noncontact IC and the data size for each content by the user.

the operation section sets the priority of the content stored in the noncontact IC. The main body processor saves the content from the noncontact IC to the main body memory in order of ascending the set priority. Thereby the content with higher priority is preferentially stored, so that the trouble of having to write from the main body memory back to the noncontact IC can be saved.

The history of use of the content is stored in the main body memory or the noncontact IC for each content. The main body processor judges the frequency of use of each content based on the history of use and saves the content from the noncontact IC to the main body memory in order of ascending the frequency of use. Thus, the content which is frequently used is preferentially stored in the noncontact IC, so that the frequency at which the content is saved can be reduced.

The history of use of the content is stored in the main body memory or the noncontact IC for each content. The main body processor reads the time and date at which each content is used last time from the history of use and saves the content from the noncontact IC to the main body memory in order of ascending the time and date at which the content is used last time. Thus, the contents of which elapsed time is short from the previous use is preferentially stored in the noncontact IC, so that the frequency at which the content is saved can be reduced.

The main body processor detects to increase the free space in the noncontact IC. The display section, when the free space in the noncontact IC is increased, selectively displays the content fallen within the increased free space in the noncontact IC among the contents stored in the main body memory. The main body processor writes from the main body memory back to the noncontact IC the content selected by the operation section among the contents fallen within the increased free space in the noncontact IC.

The operation section sets the priority of the content stored in the main body memory. The main body processor writes the content from the main body back to the noncontact IC in order of descending the preset priority. Thus, the content with higher priority is preferentially written back to the noncontact IC, so that the content with higher priority can be immediately used.

The history of use of the content is stored in the main body memory or the noncontact IC for each content. The main body processor judges a frequency of use of each content based on the history of use and writes the content from the main body memory back to the noncontact IC in order of descending the frequency of use. Thus, the content which is frequently used is preferentially written back to the noncontact IC, so that the frequency at which the content is written from the main body memory back to the noncontact IC can be reduced.

The history of use of the content is stored in the main body memory or the noncontact IC for each content. The main body processor reads a time and date at which each content is used last time and writes the content from the main body memory to the noncontact IC in order of descending the time and date at which the content is used last time. Thus, the content used last time is preferentially written back to the noncontact IC, so the frequency at which the content is written from the main body memory back to the noncontact IC can be reduced.

The main body processor stores a service code for identifying a service using the content in the noncontact IC or the main body memory in association with each content. The noncontact IC, receiving any service code from an external reader/writer, transmits the service code to the main body processor. The main body processor retrieves the content associated with the service code in the noncontact IC, retrieves the content associated with the service code in the main body memory when the content associated with the service code is not detected in the noncontact IC, and writes a detected content from the main body memory back to the noncontact IC when the content associated with the service code is detected in the main body memory.

Thus, even if any content corresponding to the service to be used is not stored in the noncontact IC, the content corresponding to the service can be written from the main body memory to the noncontact memory.

The main body processor, when the content associated with the service code which is received by the noncontact IC is not detected in any of the noncontact IC and the main body memory, acquires the content associated with the service code from outside and writes a content code unique to the acquired content to at least the noncontact IC.

Thus, even if any content corresponding to the service to be used is not stored in the noncontact IC, the main body processor can acquire the content corresponding to the service from outside and write the same in the noncontact IC.

The main body processor stores a specific function to acquire the content in association with the service code in the main body memory. The main body processor, when the content associated with the service code received by the noncontact IC is not detected in any of the noncontact IC and the main body memory, executes the specific function associated with the service code to acquire the content and writes the same in the noncontact IC.

Thus, even if the content corresponding to the service to be used is not stored in the noncontact IC, the main body processor can execute the specific function to acquire the content corresponding to the service and write the same to the noncontact IC.

A second aspect of the present invention provides a program for a mobile communication terminal including a noncontact IC being capable of directly reading/writing from/to external reader/writer and a terminal body that holds the noncontact IC. The program causes the terminal body to perform as: a main body processor function that controls an operation of the terminal body and reads/writes the content stored in the noncontact IC; a display function that displays the content stored in the noncontact IC; an operation function that receives a selection of the content displayed on the display section; and a main body memory function that stores therein data processed by the main body processor. The main body processor function saves the content selected by the operation section among the contents displayed on the display section from the noncontact IC to the main body memory, and writes the saved content back to the noncontact IC when a predetermined condition is satisfied. Thereby the effect the same as that of the first aspect can be achieved.

A third aspect of the present invention provides a mobile communication terminal including a noncontact IC being capable of directly reading/writing from/to an external reader/writer and a terminal body that holds the noncontact IC. The terminal body includes a main body processor that controls an operation of the terminal body and reads/writes the content stored in the noncontact IC; and a main body memory that stores therein data processed by the main body processor. The main body processor stores a service code for identifying a service using the content in the noncontact IC or the main body memory in association with each content. The noncontact IC, receiving any service code from an external reader/writer, transmits the service code to the main body processor. The main body processor retrieves the content associated with the service code received by the noncontact IC in the noncontact IC, retrieves the content associated with the service code in the main body memory when the content associated with the service code is not detected in the noncontact IC, and writes a detected content from the main body memory to the noncontact IC when the content associated with the service code is detected in the main body memory. Thereby even if any content corresponding to the service to be used is not stored in the noncontact IC, the content corresponding to the service can be written from the noncontact IC to the main body memory.

The main body processor, when the content associated with the service code which is received by the noncontact IC is not detected in any of the noncontact IC and the main body memory, acquires the content associated with the service code from outside and writes a content code unique to the acquired content to at least the noncontact IC. Thereby even if any content corresponding to the service to be used is not stored in the noncontact IC, the content corresponding to the service can be acquired from outside and written to the noncontact IC.

The main body processor stores a specific function for acquiring the content in association with the service code in the main body memory. The main body processor, when the content associated with the service code which is received by the noncontact IC is not detected in any of the noncontact IC and the main body memory, executes the specific function associated with the service code to acquire the content and writes the same to the noncontact IC. Thereby even if any content corresponding to the service to be used is not stored in the noncontact IC, the main body processor can execute the specific function to write the content corresponding to the service to the noncontact IC.

A fourth aspect of the present invention provides a program for a mobile communication terminal including a noncontact IC being capable of directly reading/writing from/to an external reader/writer and a terminal body that holds the noncontact IC. The program causes the terminal body to perform as: a main body processor function that controls an operation of the terminal body and reads/writes the content stored in the noncontact IC; and a main body memory function that stores therein data processed by the main body processor. The main body processor function stores a service code for identifying a service using the content in the noncontact IC or the main body memory in association with each content. The main body processor retrieves the content associated with the service code received by the noncontact IC in the noncontact IC, retrieves the content associated with the service code in the main body memory when the content associated with the service code is not detected in the noncontact IC, and writes a detected content from the main body memory to the noncontact IC when the content associated with the service code is detected in the main body memory. Thereby the effect the same as that of the third aspect can be achieved.

A fifth aspect of the present invention provides a mobile communication terminal including a noncontact IC being capable of directly reading/writing from/to an external reader/writer and a terminal body that holds the noncontact IC. The terminal body includes a main body processor that controls an operation of the terminal body and reads/writes the content stored in the noncontact IC. The main body processor stores a service core for identifying a service using the content in the noncontact IC in association with each content. The noncontact IC, receiving any service code from an external reader/writer, transmits the service code to the main body processor. The main body processor retrieves the content associated with the service code received by the noncontact IC in the noncontact IC, and when the content associated with the service code is not detected in the noncontact IC, the main body processor acquires the content associated with the service code from outside and writes a content code unique to the acquired content to at least the noncontact IC. Thereby even if the content corresponding to the service to be used is not stored in the noncontact IC, the content corresponding to the service can be acquired from outside and written to the noncontact IC.

The terminal body may further include a main body memory that stores therein data processed by the main body processor. The main body processor stores a specific function to acquire the content in association with the service code. The main body processor retrieves the content associated with the service code received by the noncontact IC in the noncontact IC, and when the content associated with the service code is not detected in the noncontact IC, the main body processor executes the specific function associated with the service code to acquire the content and writes the same to the noncontact IC.

A sixth aspect of the present invention provides a program for a mobile communication terminal including a noncontact IC being capable of directly reading/writing from/to an external reader/writer and a terminal body that holds the noncontact IC. The program causes the terminal body to perform as: a main body processor function that controls an operation of the terminal body and reads/writes the content stored in the noncontact IC. The main body processor function stores a service core for identifying a service using the content in the noncontact IC in association with each content. The noncontact IC, receiving any service code from an external reader/writer, transmits the service code to the main body processor. The main body processor function retrieves the content associated with the service code received by the noncontact IC in the noncontact IC, and when the content associated with the service code is not detected in the noncontact IC, the main body processor acquires the content associated with the service code from outside and writes a content code unique to the acquired content to at least the noncontact IC. Thereby an effect the same as that of the fifth aspect can be achieved.

A seventh aspect of the present invention provides a mobile communication terminal including a noncontact IC being capable of directly reading/writing from/to an external reader/writer and a terminal body that holds the noncontact IC. The terminal body includes: a main body processor that controls an operation of the terminal body and reads/writes the content stored in the noncontact IC; a display section that displays the content stored in the noncontact IC; an operation section that receives a selection of the content displayed on the display section; and a main body memory that stores therein information for identifying an external memory which is disposed out of the terminal body. The main body processor saves the content selected by the operation section among the contents displayed on the display section from the noncontact IC to the external memory by communicating with the external memory, and when a predetermined condition is satisfied, the main body processor acquires the saved content from the external memory by communicating with the external memory and writes the same back to the noncontact IC. Thereby a various kinds of contents can be held in the mobile communication terminal regardless of the volume of data of the noncontact IC. Additionally, a desired service can be immediately used by switching the memory location of the content between the noncontact IC and the external memory.

An eighth aspect of the present invention provides a program for the mobile communication terminal including a noncontact IC being capable of directly reading/writing from/ to an external reader/writer and a terminal body that holds the noncontact IC. The program causes the terminal body to perform as: a main body processor function that controls an operation of the terminal body and reads/writes the content stored in the noncontact IC; a display function that displays the content stored in the noncontact IC; an operation function that receives a selection of the content displayed on the display section; and a main body memory function that stores therein information for identifying an external memory which is disposed out of the terminal body. The main body processor function saves the content selected by the operation section among the contents displayed on the display section from the noncontact IC to the external memory by communicating with the external memory, and when a predetermined condition is satisfied, the main body processor acquires the saved content from the external memory by communicating with the external memory and writes the same back to the noncontact IC. Thereby an effect the same as that of the seventh aspect can be achieved.

Here, all necessary features of the present invention are not listed in the summary of the invention. The sub-combinations of the features may become the invention.

DESCRIPTION OF EXEMPLARY EMBODIMENTS

Hereinafter, the present invention will now be described through preferred embodiments. The embodiments do not limit the invention according to claims and all combinations of the features described in the embodiments are not necessarily essential to means for solving the problems of the invention.

Figure 1:
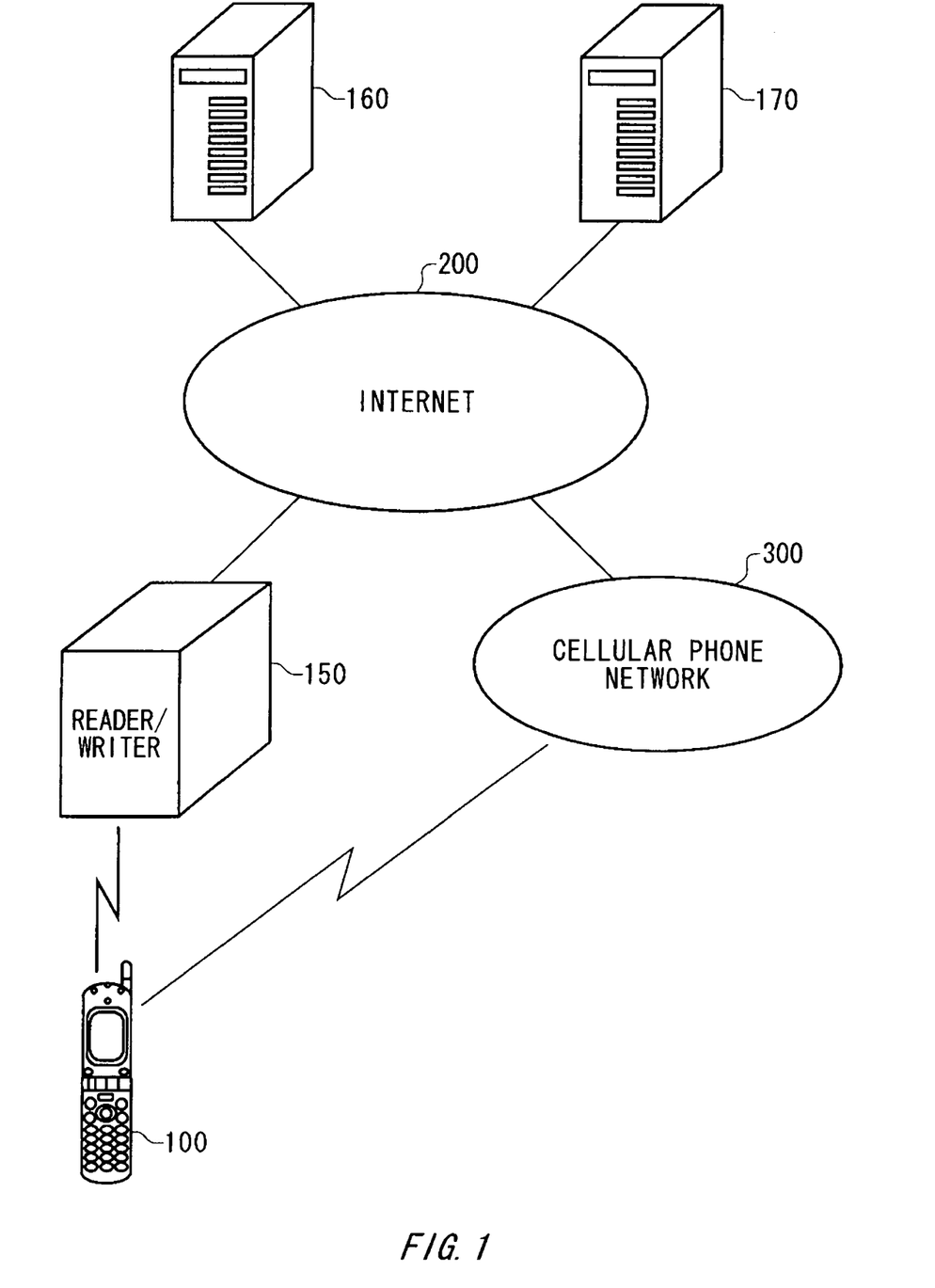
FIG. 1 shows an example of system configuration according to an embodiment of the present invention.

FIG. 1 shows an example of system configuration according to an embodiment of the present invention. The system includes an application server 160, a content server 170, a reader/writer 150 and a mobile communication terminal 100. The reader/writer 150 communicates with the application server 160 and content server 170 respectively through Internet 200. Additionally, the mobile communication terminal 100 communicates with the application server 160 and the content server respectively through a cellular phone network 300 and the Internet 200. The mobile communication terminal 100 includes therein a noncontact IC card described later and allows to use services such as settlement on transport facilities, electronic money and personal identification by communicating in noncontact with the reader/writer 150. The reader/writer 150 is such as an automatic wicket of a transport facility, a point-of-sale terminal for making payment by electronic money and an identification device terminal for performing a personal identification. The mobile communication terminal 100 downloads a content such as an electronic ticket and a value of electronic money from the content server 170. Additionally, the mobile communication terminal 100 downloads a new application program 32 from the application server 160. Hereinafter, any content and value stored in the noncontact IC 90 of the mobile communication terminal 100 is referred to as a content.

Here, the application server 160 is an example of external memory that stores therein an application program and data files used by the application program. The content server 170 is an example of external memory that stores therein contents and values.

Here, the reader/writer 150 and the mobile communication terminal 100 may be connected to and communicated with the application server 160 or the content server 170 directly by a serial cable such as a USB or through the LAN.

Meanwhile, a company which offers a service may store contents in the application server 160 or the content server 170, and a user may store contents in the application server 160 or the content server 170.

Figure 2:
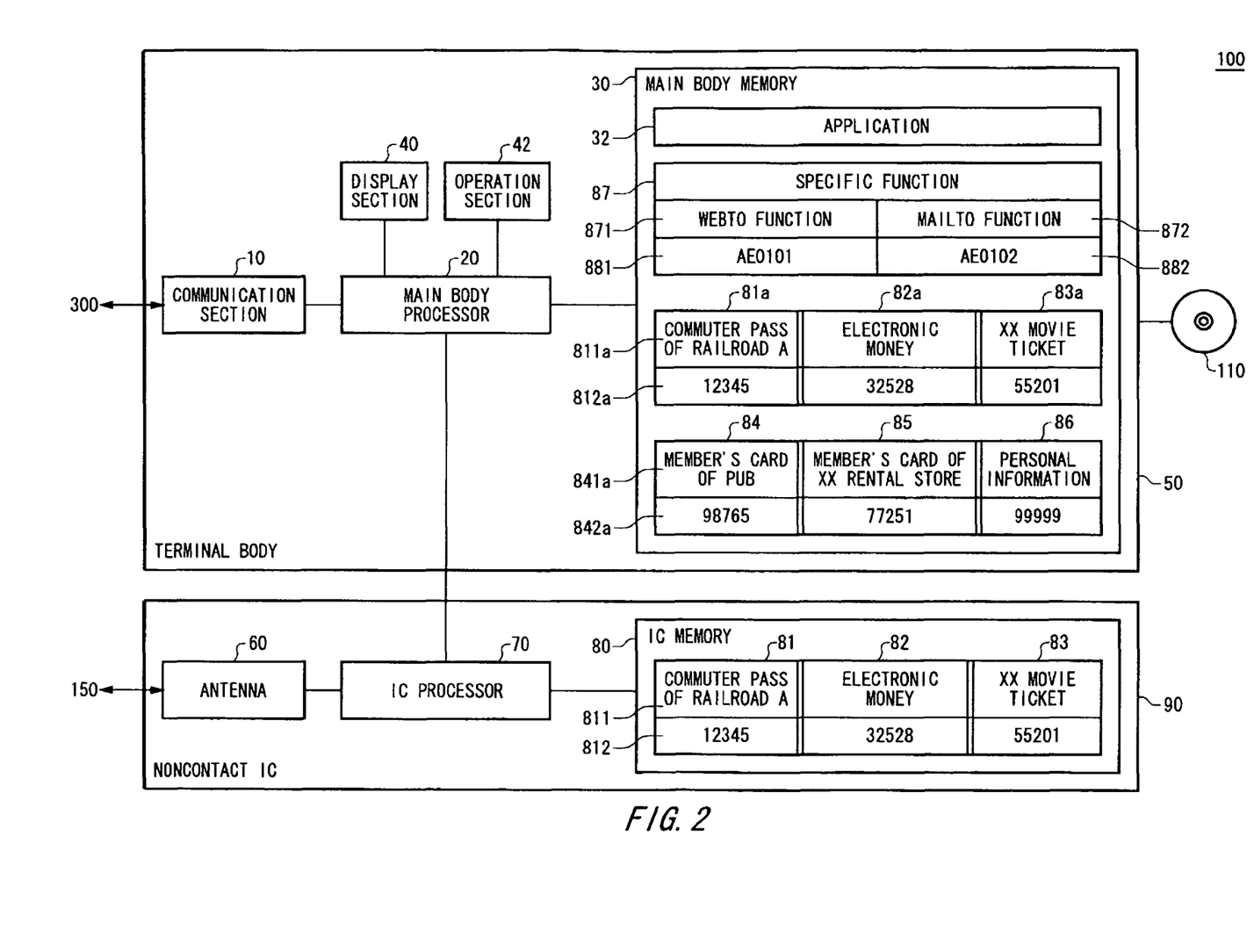
FIG. 2 is a block diagram showing the functional configuration of a mobile communication terminal 100.

FIG. 2 shows the functional configuration of the mobile communication terminal 100. The mobile communication terminal 100 includes a noncontact IC 90 being capable of directly reading/writing a content from the external reader/writer 150 and a terminal body 50 that holds the noncontact IC 90. The terminal body 50 includes a main body processor 20, a main body memory 30, a display section 40, an operation section 42 and a communication section 10. The main body memory 30 stores data processed by the main body processor 20 such as application program 32, various contents and the specific functions 87 associated with service codes. The service code means a code for identifying any of a service which is offered by using the content, a company which provides the service and a store on which the service can be used.

The main body processor 20 controls the operation of the terminal body 50 and reads/writes contents stored in the noncontact IC 90 according to the application program 32. Additionally, the main body processor 20 executes the specific function 87 to acquire the content through the communication section 10 and writes the same to the IC memory 80. The communication section 10 downloads the content and the application program 32 through the cellular phone network 300 and the internet 200.

The noncontact IC 90 includes an IC memory 80 that stores therein contents, an IC processor 70 that reads/writes the contents to/from the IC memory 80 and an antenna 60 that communicates with an external reader/writer 150. The IC processor 70 communicates with the reader/writer 150 through the antenna 60 and performs read/write of data on the IC memory 80 based on a request from the reader/writer 150. Additionally, the IC processor 70 transmits/receives the contents to/from the main body processor 20. According to the present embodiment, the IC memory 80 stores therein a content 81 "commuter pass of railroad A", a content 82 "electronic money" and a content 83 "xx movie ticket". Each content includes at least a unique content code for each content. Each content may further include an index clearly showing the matter of the content such as the intended use and the store name. For example, the content 81 "commuter pass of railroad A" stored in the IC memory 80 includes an index 811 as "commuter pass of railroad A" which clearly shows the intended use of the content and a content code 812 as "12345" which is unique to each content.

The main body processor 20 stores in the main body memory 30 the copies of the contents stored in the IC memory 80. For example, the main body processor 20 stores in the main body memory 30 a content 81a "commuter pass of railroad A", a content 82a "electronic money" and a content 83a "xx movie ticket" as the copies of the contents stored in the IC memory 80. The content 81a "commuter pass of railroad A" includes a copy 811a of the index "commuter pass of railroad A" and a copy 812a of the content code "12345".

Here, the most part of the memory capacity of the IC memory 80 according to the present embodiment is occupied by the content 81 "commuter pass of railroad A", the content 82 "electronic money" and the content 83 "xx movie ticket", and there is no free space in which any other content is additionally stored. Meanwhile, the main body memory 30 has a memory capacity larger than that of the IC memory 80 and has any free space in which the contents are further stored in addition to the application program 32 and the plurality of contents shown in FIG. 2. For example, the main body memory 30 stores the content which is saved from the IC memory by the main body processor 20 (hereinafter referred to as a saved content). For example, the main body memory 30 stores a content 84 "member's card of pub" and a content 86 "personal information" as the saved contents. The saved content includes an index of the content and a content code as well as the copies (81a, 82a and 83a) of the contents stored in the IC memory 80. For example, the content 84 "member's card of xx pub" includes an index 841a as "member's card of xx pub" and a content code 842a as "98765".

Additionally, the main body memory 30 stores therein a content acquired from the content server 170 by downloading (hereinafter referred to as an acquired content). For example, the main body memory 30 stores therein a content 85 "member's card of xx rental store" as the acquired content. The acquired content includes an index of the content and a content code as well as the other contents. For example, the content 85 "member's card of xx rental store" includes an index as "member's card of xx rental store" and a content code as "77251"

The specific function 87 stored in the main body memory 30 means a function included in the terminal body 50, such as an web access function to access Web site and MAILTO function to send an e-mail. According to the present embodiment, the main body memory 30 stores a specific function 817 "web access function" to acquire a content in association with a service code 881 "AE0101" and a specific function 872 "MAILTO function" to send an e-mail in association with a service code 882 "AE0102". The specific function 87 may be a function which is executed by combining a plurality of specific functions 87, for example, the "web access function" and the "MAILTO function" are sequentially executed in the order as described.

Here, in the embodiment, saving the content means an operation to delete a content from the IC memory 80 after the main body processor 20 stores in the main body memory 30 a copy of the content stored in the IC memory 80. The operation is performed based on that the copy of the content stored in the main body memory 30 is written back to the IC memory 80 again when a predetermined condition is satisfied. That is, the main body processor 20 can increase the free space of the IC memory 80 by the volume corresponding to the size of the saved content by saving the content from the IC memory to the main body memory 30.

The main body processor 20 separately stores the copy of the content currently stored in the IC memory 80, the saved content which is saved from the IC memory 80 and the acquired content in the main body memory 30, respectively. The display section 40 displays the contents except for the saved content and the acquired content among the contents to be stored in the main body memory, that is, the display section 40 displays the copies of the contents currently stored in the IC memory 80. In this case, the main body processor 20 can display the content stored in the IC memory 80 without reading data stored in the IC memory 80 each time.

However, the operation of the display section 40 which displays the contents stored in the IC memory is not limited to the above-described embodiment. For example, the display section 40 may display the content read from the IC memory 80 by the main body processor 20 each time as the content stored in the IC memory 80. Meanwhile, the main body processor 20 may store the index of the content stored in the IC memory 80. The display section 40 may display the list of the indexes stored in the main body memory 30 as the list of the contents stored in the IC memory 80. The display section 40 displays the contents which have been processed in a predetermined format by the application program 32.

The operation section 42 receives an instruction to save any of the plurality of contents displayed on the display section 40 from the IC memory 80. The main body processor 20 saves from the IC memory 80 to the main body memory 30 the content selected as the content to be saved to the main body memory 30 among the plurality of contents displayed on the display section 40 as the content to be stored in the IC memory 80. In this case, when the copy of the content selected to be saved to the main body memory 30 has been already stored in the main body memory 30, the main body processor 20 immediately deletes the content selected to be saved from the IC memory 80. Meanwhile, when the copy of the content selected to be saved has not been stored in the main body memory 30, the main body processor 20 firstly stores the copy of the content selected to be saved in the main body memory 30, and then, deletes the content selected to be saved from the IC memory 80.

When a predetermined condition is satisfied, the main body processor 20 writes the saved content saved to the main body memory 30 back to the IC memory 80. The predetermined condition means a state that an instruction to write back to is inputted by a user, a state of receiving from the reader/writer 150 and a state that the content corresponding to the service code is saved to the main body memory 30.

Additionally, when a predetermined condition is satisfied, the main body processor 20 writes the acquired content stored in the main body memory 30 to the IC memory 80. The predetermined condition means, for example, a state that the main body processor 20 retrieves the content corresponding to the service code received from the reader/writer 150 in the IC memory 80, and when the content corresponding to the service code is not detected in the IC memory 80, the main body processor 20 retrieves the content corresponding to the service code in the main body memory 30 and detects the content corresponding to the service code in the main body memory 30.

Thereby the mobile communication terminal 100 can hold various contents at a time regardless of the volume of data of the IC memory 80. Additionally, a desired service can be immediately used by switching the memory location of the contents between the IC memory 80 and the main body memory 30.

When the content corresponding to the service code received by the noncontact IC 90 is not detected in any of the IC memory 80 and the main body memory 30, the main body processor 20 acquires the content associated with the service code via the network and writes the content code unique to the acquired content to at least the IC memory 80.

Additionally, when the content corresponding to the service code received by the noncontact IC 90 is not detected in any of the IC memory 80 and the main body memory 30, the main body processor 20 may acquire the content by executing the specific function 87 associated with the service code instead of acquiring the content via the network, and write the same to the IC memory 80.

Thereby even if the content corresponding to the service is not stored in the IC memory 80, the content corresponding to the service can be acquired via the network, or the content corresponding to the service can be acquired by executing the specific function 87 and write the same to the IC memory 80.

The main body processor 20 stores the specific function 87 that acquires the content corresponding to the service code in the main body memory 30. Here, the main body processor 20 stores information for identifying the application server 160 and the content server 170 in association with the service codes. For example, the main body processor 20 may store the URL of such as the content server 170 in association with the service code. Additionally, the main body processor 20 may store information for identifying an external memory in which the content is stored instead of URL.

The program to operate the mobile communication terminal 100 is installed on the mobile communication terminal 100 through a recording medium 110 or a network and executed in the mobile communication terminal 100. The program installed on the mobile communication terminal 100 and executed therein causes the mobile communication terminal 100 to function as the main body processor 20, the main body memory 30, the communication section 10, the display section 40, the operation section 42 and the IC processor 70. Additionally, the program may cause the mobile communication terminal 100 to function as the main body processor 20, the main body memory 30, the communication section 10 and the IC processor 70.

The above-described programs may be provided from a storage device such as a hard disk or a RAM disposed on a server system connected to a private communication network or Internet 200 to the mobile communication terminal 100 through the network, and may be stored in an external storage medium e.g. an optical storage medium such as a flexible disk, a DVD and a PD, a magneto-optical recording medium such as a MD, a tape medium and a semiconductor memory such as an IC card.

Figure 3:
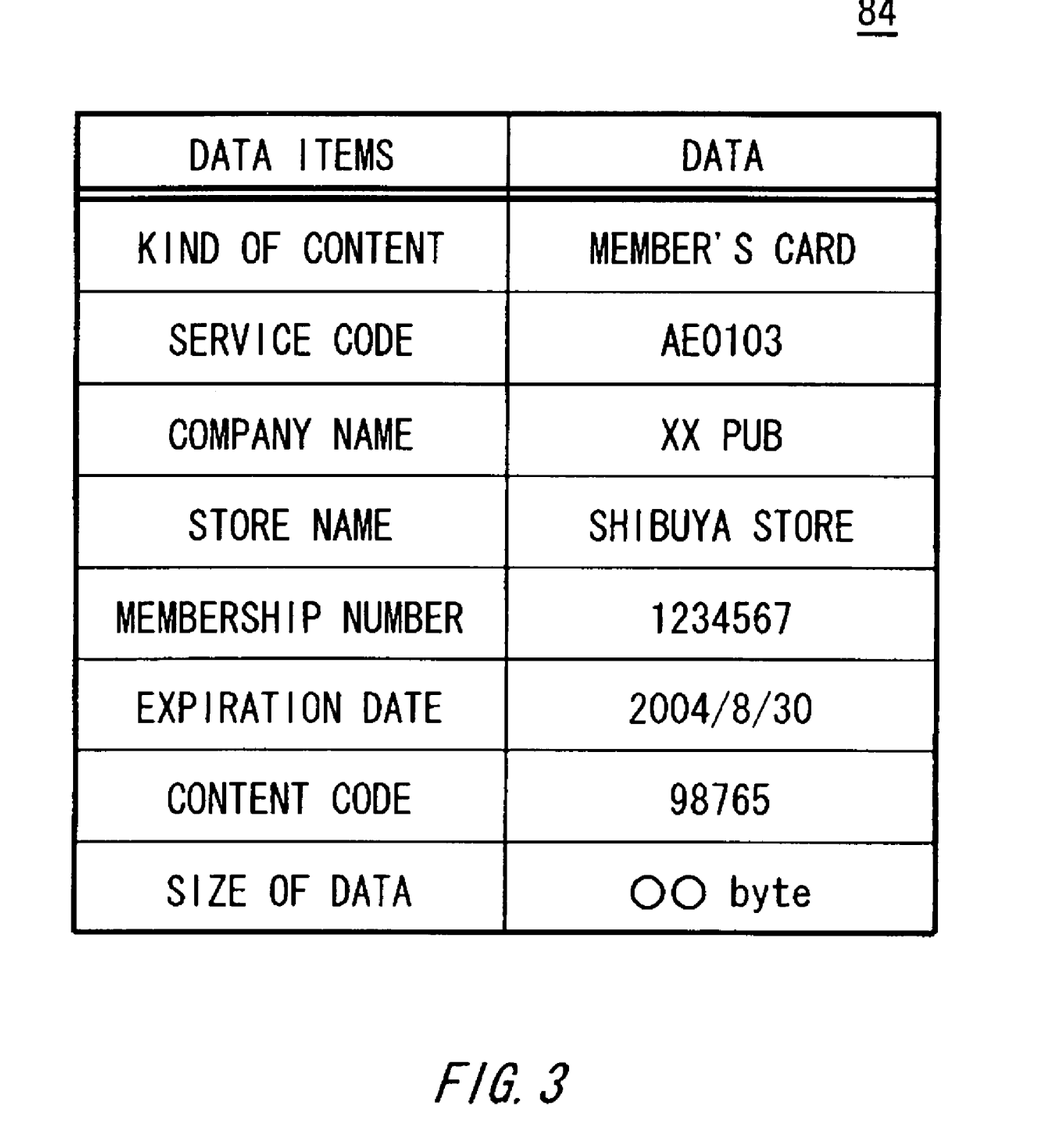
FIG. 3 shows an example of data items included in a content.

FIG. 3 shows data items of the content 84 "member's card of xx pub" as an example of content. The content data item includes the kind of content, the service code, the company name, the store name, the membership number, the expiration date, the content code and the size of data. The kind of content is information indicative of the intended use of the content. The service core identifies any of the service provided by using the content, the company which offers the service and the store on which the service can be used. Each of the company name and the store name is text information indicative of the name for each of the company and the store which offer a service. The membership number is a unique code allocated to a user who uses the service. The expiration date means the expiration date of the content. The content code is a unique number allocated to the content. The size of data is the amount of data of the content.

When the user inputs to the mobile communication terminal 100 an instruction to download a content from the content server 170, the main body processor 20 downloads the content from the content server 170 and stores the same in the main body memory 30 and the IC memory 80. In this case, the main body processor 20 stores at least the content code and the service code in the IC memory 80. Additionally, the main body processor 20 may create the index of the content by any of the kind of content, the company name and store name among the data items, or by combining those data items. Then, the main body processor 20 may display a list of the created indexes on the display section 40 as the list of the contents.

The reader/writer 150 reads at least the content code from the IC memory 80. Then, the reader/writer 150 acquires the other data items of the content identified by the content code from the content server 170. The reader/writer 150 may acquire the other data items of the content identified by the content code from the server installed in the store having the reader/writer 150 via the office LAN. When the IC memory 80 stores therein all data items of the content, the reader/writer 150 may read all data items regarding the content from the IC memory 80. The reader/writer 150 checks the validity of the data item acquired from the content serer 170. For example, the reader/writer 170 checks whether the data item whose validity has expired. Additionally, the reader/writer 150 checks that the company name and the store name are matched with the company name and the store name recorded in the reader/writer 150.

Figure 4:
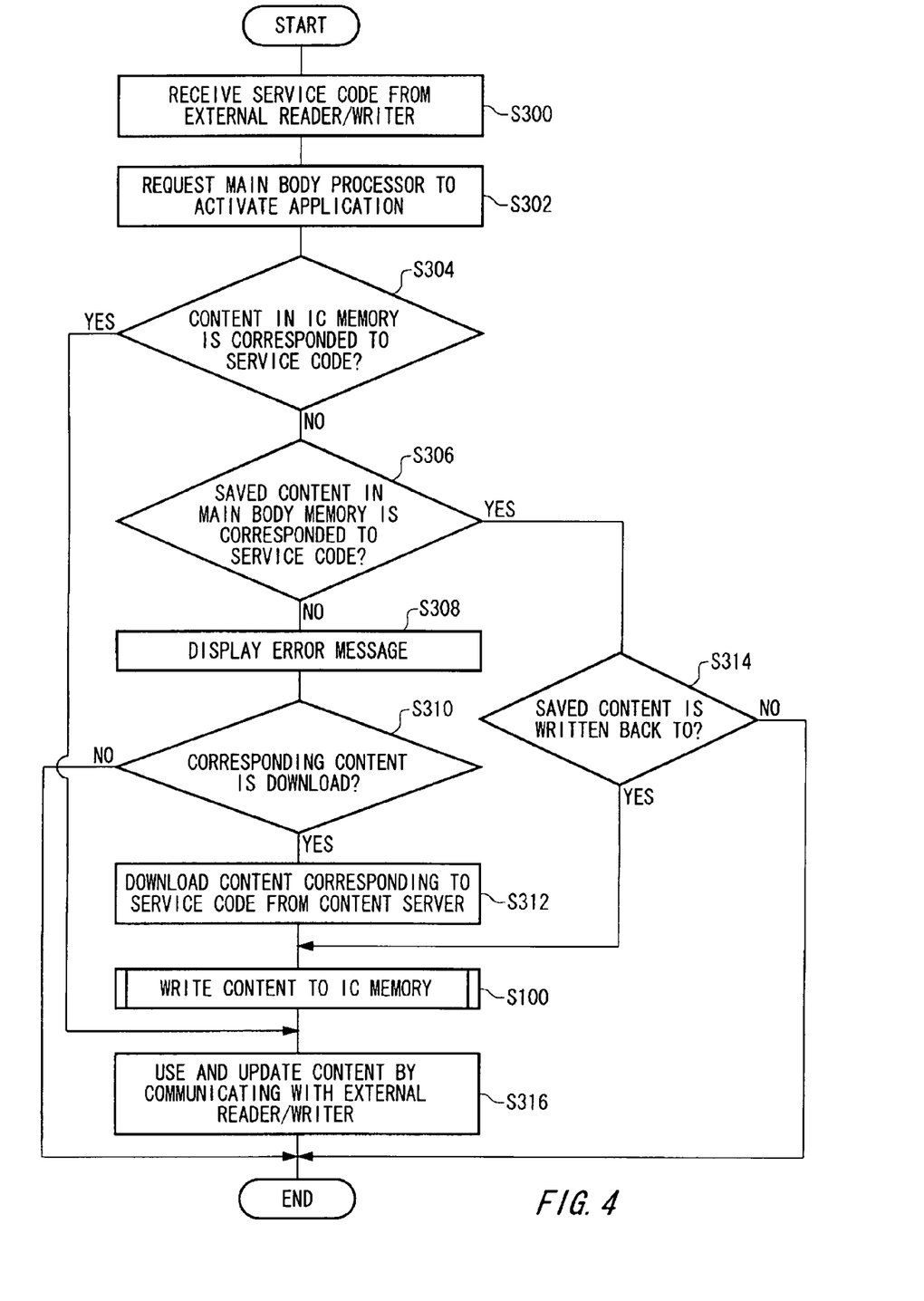
FIG. 4 is a flowchart showing an example of operation to change contents stored in an IC memory 80 by the mobile communication terminal 100 dependent on a service provided by a reader/writer 150.

FIG. 4 shows an example of operation to change contents stored in the IC memory 80 by the mobile communication terminal 100 dependent on a service offered by a reader/writer 150. Firstly, the noncontact IC 90 receives the service code from the external reader/writer 150 (S300). Next, the IC processor 70 requests the main body processor 20 to activate the application program 32 that reads/writes the content (S302). The main body processor 20 activates the application program 32 according to the request. The activated application program 32 reads the content in the IC memory 80 and judges whether any of the contents in the IC memory 80 is corresponding to the service code received from the reader/writer 150 (S304). For example, the application program 32 retrieves the contents stored in the IC memory 80 by using the service code received from the reader/writer 150 as a retrieval key. Then, when the content of which data items includes the service code received from the reader/writer 150 is detected in the IC memory 80, the application program 32 is detected in the IC memory 80, the application program 32 judges that the content in the IC memory 80 is corresponding to the service code received from the reader/writer 150.

When the application program 32 judges that the content in the IC memory 80 is corresponding to the service code received form the reader/writer 150 in a step S304 (S304: Yes), advance to a step S316. Meanwhile, when the application program 32 judges that the content in the IC memory 80 is not corresponding to the service code received from the reader/writer 150 (S304: No), the application program 32 judges whether the saved content in the main body memory 30 is corresponding to the service code received from the reader/writer 150 (S306). For example, the application program 32 retrieves the saved content stored in the main body memory 30 by using the service code received from the reader/writer 150 as a retrieval key. Then, when the saved content of which data items includes the service code received from the reader/writer 150 is detected in the main body memory 30, the application program 32 judges that the saved content in the main body memory 30 is corresponding to the service code received from the reader/writer 150.

In the step 306, judging that the saved content in the main body memory 30 is not corresponding to the service code received from the reader/writer 150 (S306: No), the application program 32 displays on the display section 40 an error message indicating that the content corresponding to the service is not stored in the mobile communication terminal (S308), and displays on the display section 40 a message to inquire of the user whether the content corresponding to the service is downloaded from the content server 170 via the Internet 200 (S310). When an instruction indicating that the content corresponding to the service is not download is inputted (S310: No), the flow is ended. Meanwhile, in the step 310, an instruction indicating that the content corresponding to the service is downloaded from the content server 170 via the Internet 200 is inputted (S310: Yes), the application program 32 identifies the content server 170 corresponding to the service code. Then, the main body processor 20 accesses the identified content server 170 and asks to issue the content corresponding to the service code. The application program 32 transmits personal information required from the content server 170 as the condition to issue the content, performs the necessary transaction and then, downloads the content issued from the content server 170 as the content corresponding to the service code (S312).

In the step S306, when the application program 32 judges that the saved content in the main body memory 30 is not corresponding to the service code received from the reader/writer 150 (S306: No), that is, the application program 32 does not detect the content corresponding to the service code received by the noncontact IC 90 in any of the IC memory 80 and the main body memory 30, the application program 32 may execute the specific function 87 associated with the service code to acquire the content instead of downloading the content issued from the service code and write the same to the IC memory 80.

Specifically, the application program 32 displays on the display section 40 an error message indicating that the content corresponding to the service is not stored in the mobile communication terminal 100. Additionally, the application program 32 displays on the display section 40 a message to inquire of the user whether the following operation is performed: executing the specific function 87 corresponding to the service to acquire the content and writing the same to the IC memory 80. When the instruction indicating to acquire the content corresponding to the service and write the same to the IC memory 80, the application program 32 executes the specific function 87 associated with the service code to acquire the content and writes the same to the IC memory 80. For example, the application program 32 displays Web page of a company that offers the service on the display screen of the mobile communication terminal 100 by means of an web access function. When the user entries a membership form displayed on the Web page and pushes a send key, the application program 32 transmits the entry to the server designated by the company by the MAILTO function. Then, when the membership is accepted by the server of the company, the content for the exclusive use of members is downloaded and written to the IC memory 80.

In the step 306, judging that the saved content in the main body memory 30 is corresponding to the service code received from the reader/writer 150 (S306: Yes), the application program 32 displays a message to confirm with the user whether it is necessary to write the saved content in the main body memory 3, which is judged as that it is corresponding to the service code back to the IC memory 80 (S314). When a decision indicating that the saved content is not written back to the IC memory 80 is inputted through the operation section 42 (S314: No), the flow is ended. Meanwhile, when a decision indicating that the saved content corresponding to the service code acquired from the reader/writer 150 is written back to the IC memory 80 is inputted through the operation section 42 (S314: Yes), advance to step 100.

Next, the application program 32 writes the content downloaded in the step S312 or the saved content to the IC memory 80 (S100). The detail of the step 100 will be described later. Next, the noncontact IC 90 transmits the data items of the content stored in the IC memory 80 to the reader/writer 150, performs a predetermined transaction and updates the content dependent on the service used (S316). For example, the noncontact IC 90 withdraws the value of electronic money in compensation for the purchased product or service and writes the station name passed through the automatic wicket to the content of the commuter pass. Then, the flow is ended. According to the operation of the flow, even if the content corresponding to the service to be used by the user is not stored in the IC memory 80, the mobile communication terminal 100 can easily write the content corresponding to the service from the main body memory 30 or the content server 170.

Here, the mobile communication terminal 100 may change the contents stored in the IC memory 80 dependent on the service offered by the reader/writer 150 as described below.

Specifically, firstly in the step 306, when the application program 32 judges that the saved content in the main body memory 30 is not corresponding to the service code received from the reader/writer 150 (S306: No), that is, the application program 32 does not detect the content corresponding to the service code received by the noncontact IC 90 in any of the IC memory 80 and the main body memory 30, the application program 32 skips the step S308 and the step S310 and downloads a content issued from the content server 170 as the content corresponding to the service code (S312).

Here, the application program 32 may execute the specific function 87 associated with the service code to acquire the content instead of downloading the content issued from the content server 170 and write the same to the IC memory 80.

Next, in the step 306, when the application program 32 judges that the saved content in the main body memory 30 is corresponding to the service code received from the reader/writer 150 (S306: Yes), that is, when the application program 32 retrieves the content corresponding to the service code received by the noncontact IC 90 in the IC memory 80 and does not detect the content corresponding to the service code in the IC memory 80, the application program 32 retrieves the content corresponding to the service code in the main body memory 30. Then, detecting the content corresponding to the service code in the main body memory 30, the application program 32 may skip the step 314 and advance to the step 100.

Here, the application program 32 may write not the saved content corresponding to the service code thereof but the acquired content corresponding to the service code from the main body memory 30 to the IC memory 80. Here, in the embodiment, the display section 40 and the operation section 42 may be omitted.

Here, in the step 304, when the application program 32 judges that the content in the IC memory 80 is not corresponding to the service code received from the reader/writer 150 (S304: No), the application program 32 may skip the step S306 and the step S308 and perform the step S310. That is, when the application program 32 retrieves the content corresponding to the service code received from the reader/writer 150 and does not detect the same in the IC memory 80, the application program 32 may download the content from the content server 170 without retrieving in the main body memory 30 (S312). Meanwhile, when information for identifying an external memory in which the contents are stored is stored in the main body processor 20 instead of URL, the application program 32 may refer the information and directly communicate with the external memory without through the network to acquire the content in the step S312.

Figure 5:
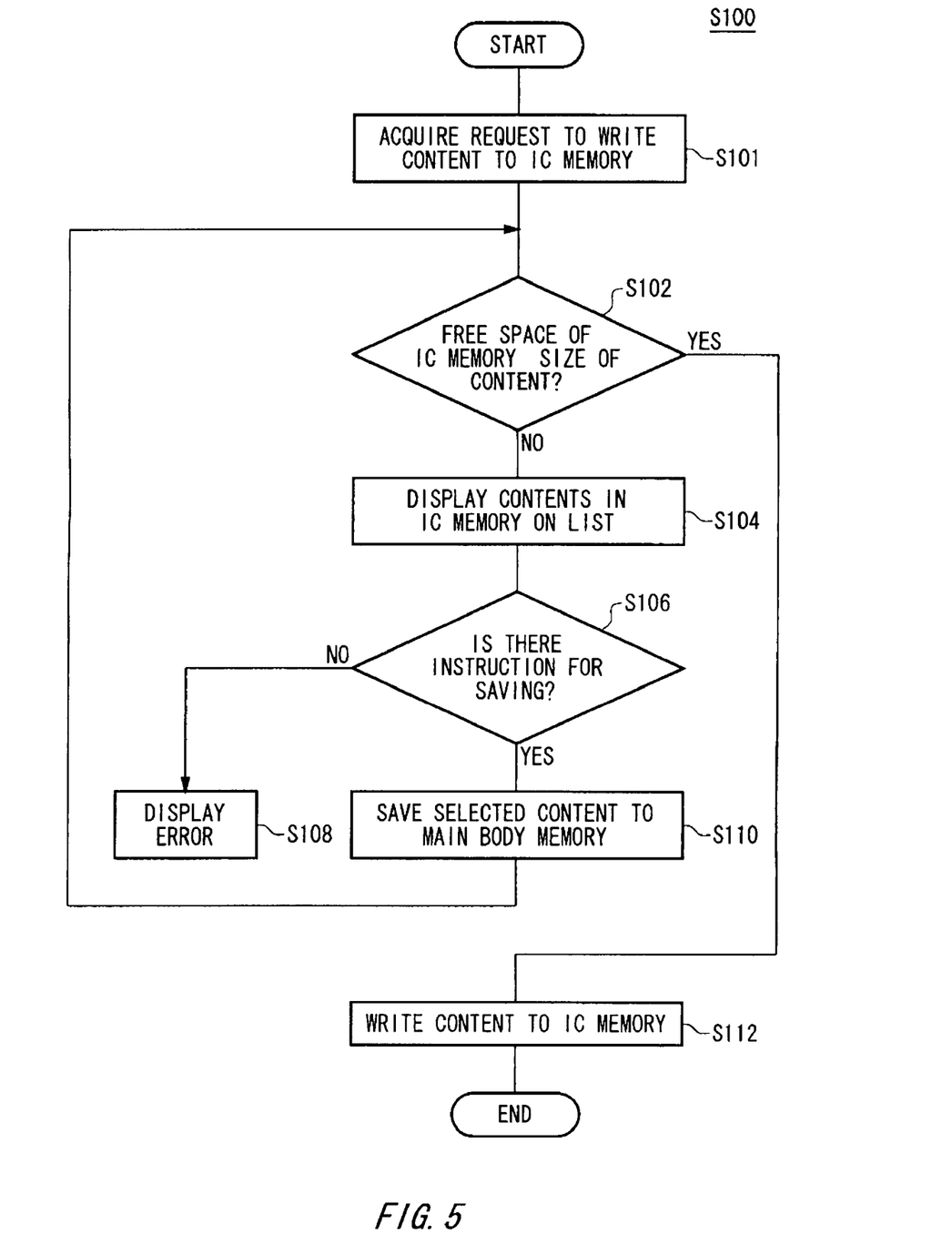
FIG. 5 is a flowchart showing a detailed operation of the step 100 in FIG. 4.

FIG. 5 shows a detailed operation of the step 100 in FIG. 4. In the step 100, the application program 32 writes a designated content to the IC memory 80. The application program 32 previously sets the priority of the contents stored in the IC memory 80 according to the input from the operation section 42 in the present embodiment. The application program 32 acquires a request for writing the content to the IC memory 80 (S100). The request for writing the content may be received from the reader/writer 150, or may be acquired from the operation section 42 as an instruction of the user in the above-described step S310 and the step S314. The write request includes the size of data of the content to be written. The application program 32 checks the free space of the IC memory 80 and judges whether the free space is more than the size of the data included in the write request (S1020). Judging that the free space of the IC memory 80 is more than the size of the data included in the write request (S102: Yes), the application program 32 writes the content associated with the write request to the IC memory 80 (S112).

Meanwhile, judging that the free space of the IC memory 80 is less than the size of the data included in the write request (S102: No), the application program 32 displays the content stored in the IC memory 80 on the display section 40 as a list (S104). In this case, the application program 32 displays on a list a plurality of contents in ascending order or descending order according to the priority of the contents previously set by the operation section 42. Then, the application program 32 waits for an instruction to save any of the displayed contents to the main body memory 30 (S106). When the content to be saved to the main body memory 30 is not selected for a predetermined period (S106: No), the application program 32 displays an error massage on the display section 40 (S108).

Meanwhile, when any of the contents stored in the IC memory 80 is selected as the content to be saved to the main body memory 30 by the operation section 42 (S106: Yes), the application program 32 saves the selected content from the IC memory 80 to the main body memory 30 (S110). Then, return to the step 102. The application program 32 saves the contents stored in the IC memory 80 to the main body memory 30 until the free space of the IC memory 80 is more than the size of the content to be written. Then, the flow is ended. According to the flow, the mobile communication terminal 100 can surly hold the free space which is necessary to write a new content without considering the free space of the IC memory 80 and the size of data for each content by the user.

Here, the application program 32 displays on the list the contents stored in the IC memory 80 and saves the selected content to the main body memory 30 from the step 104 to the step S110. Alternatively, the application program 32 may automatically save the contents from the IC memory 80 to the main body memory 30 in order of ascending the priority thereof. That is, the application program 32 may save the contents from the IC memory to the main body memory 30 in order of ascending the priority thereof without waiting for the instruction of the user. Thereby the contents with higher priority can be preferentially stored in the IC memory 80, and the trouble of the user for saving the contents from the IC memory to the main body memory 30 can be reduced. Here, the priority of the content inputted by the operation section 42 can be recorded on any of the IC memory 80 and the main body memory 30. Additionally, the content may be saved to an external memory, such as the content server 170 instead of saving the content to the main body memory 30 in the step 110. In this case, information for identifying the external memory, such as the URL of the content server 170 is stored in the IC memory 80 or the main body memory 30. Then, the application program 32 may be connected to the external memory through the network according to the information and store the content in the external memory in association with the information for identifying the user or the mobile communication terminal 100.

Additionally, the application program 32 may store the history of use of each content in the main body memory 30 or the IC memory 80. Then, the main body processor 20 judges the frequency of use of each content based on the history of use and automatically and save the contents in order of ascending the frequency of use. That is, the contents may be saved from the IC memory 80 to the main body memory 30 in order of ascending the frequency of use without waiting for the instruction of the user. Thereby the content which is frequently used is preferentially stored in the IC memory 80, and the trouble of the user for saving the content from the IC memory 80 to the main body memory 30 can be reduced.

Meanwhile, the application program 32 may read the time and date at which each content is used last time based on the history of use and automatically save the content from the IC memory 80 to the main body memory 30 in order of ascending the time and date at which the content is used last time. That is, the application program 32 may save the content from the IC memory 80 to the main body memory 30 in order of ascending the time and date at which the content is used last time without waiting for the instruction of the user. Thereby the contents of which elapsed time from the previous use is shorter can be preferentially stored in the IC memory 80, and user's troubles concerning saving the contents from the IC memory 80 to the main body memory 30 can be reduced.

Here, the application program 32 may automatically save the content from the IC memory 80 to the main body memory 30 in order of ascending the priority, the frequency of use and the time and date at which the content is used last time.

Figure 6:
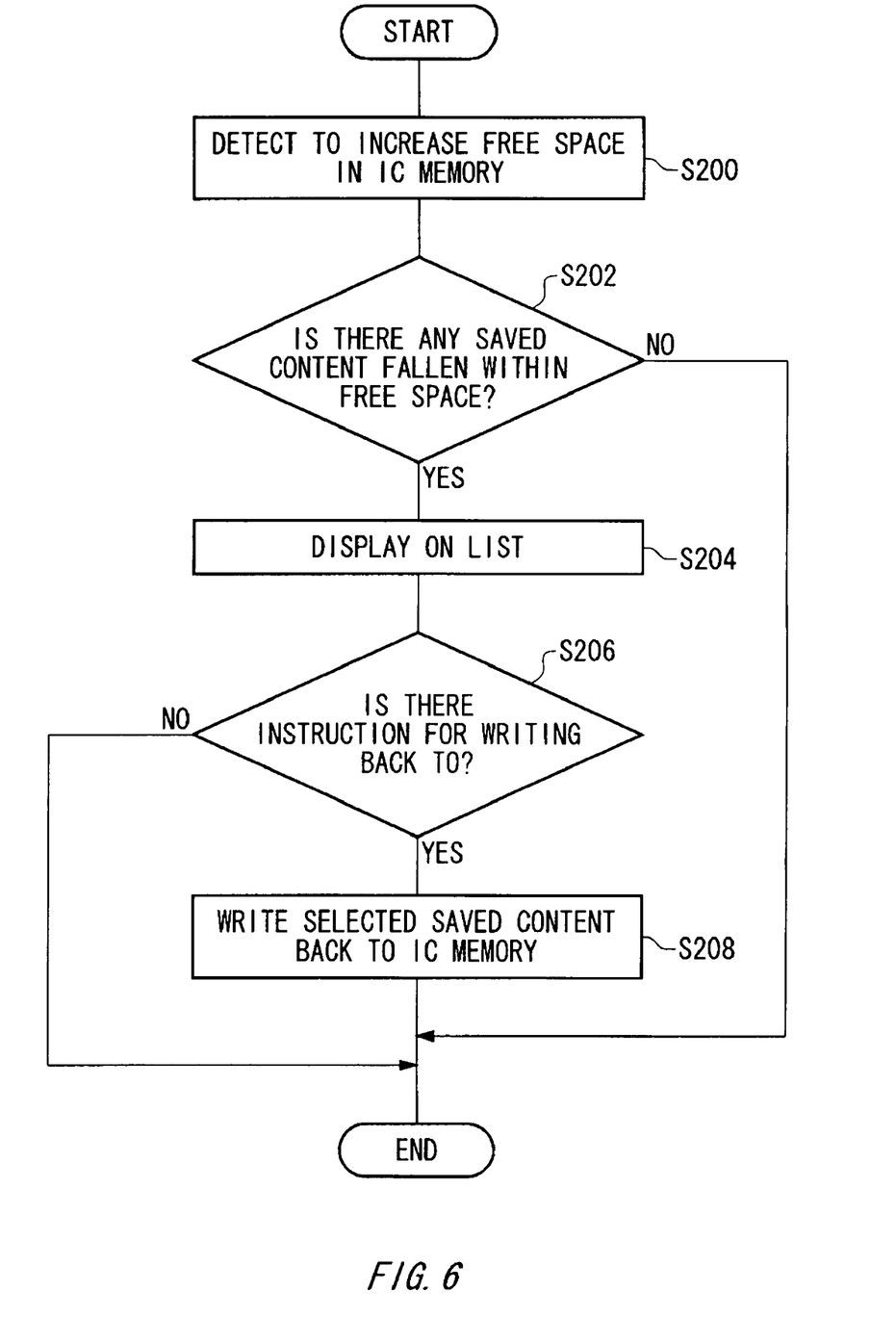
FIG. 6 is a flowchart showing an example of operation of the mobile communication terminal 100 to write the content saved to the main body memory 30 back to the noncontact IC 900.

FIG. 6 shows an example of operation of the mobile communication terminal 100 to write the content saved to the main body memory 30 back to the noncontact IC 80. In the present embodiment, firstly, the operation section 42 previously sets the priority of the saved contents stored in the main body memory 30. The application program 32 detects to increase the free space in the IC memory 80 (S200). Then, the application program 32 judges whether there is any saved content which can be fallen within the increased free space of the IC memory 80 among the saved contents saved to the main body memory 30 (S202). Judging that there is any saved content fallen within the increased free space in the IC memory 80 among the saved contents saved to the main body memory 30 (S202: Yes), the application program 32 displays the saved contents on a list so as to select any of the saved contents. In this case, the application program 32 displays the plurality of saved contents on the list in ascending order or descending order according to the priority of the saved contents previously set by the operation section 42 (S204).

Then, the application program 32 waits for an instruction to write any of the saved contents displayed on the list back to the IC memory 80 (S206). When any of the saved contents stored in the main body memory 30 is selected by the operation section 42 as the saved content to be written back to the IC memory 80 (S206: Yes), the application program 32 writes the selected saved content from the main body 30 back to the IC memory 80 (S208). Meanwhile, when the saved content to be written back to the IC memory is not selected for a predetermined period (S206: No), the flow is ended.

Here, the application program 32 displays the saved contents stored in the main body memory on a list and writes the selected saved content back to the IC memory 80 from the step S204 to the step S208. Alternatively, the application program 32 may automatically write the contents from the main body memory 30 to the IC memory 80 in order of descending the predetermined priority. That is, the application program 32 may write the contents from the main body memory 30 to the IC memory 80 in order of descending the predetermined priority without waiting for the instruction of the user. Thus, the content with higher priority is preferentially written back to the IC memory 80, so that the user can immediately use the content with higher priority.

Additionally, the application program 32 may judge the frequency of use for each content based on the above-described history of use, and automatically write the contents from the main body memory 30 back to the IC memory 80 in order of descending the frequency of use. That is, the application program 32 may write the contents from the maim body memory 30 to the IC memory 80 in order of descending the frequency of use without waiting for the instruction of the user. Thus, the content which is frequently used is preferentially written back to the IC memory 80, so that the user can immediately use the content which is frequency used.

Additionally, the application program 32 may read the time and date at which each content is used last time based on the above-described history of use, and automatically write the contents from the main body memory 30 to the IC memory 80 in order of descending the time and date at which the content is used last time. That is, the application program 32 may write the contents from the main body memory 30 back to the IC memory 80 in order of descending the time and date at which the content is used last time without waiting for the instruction of the user. Thus, the content which is used last time is preferentially written back to the IC memory 80, so that the user can immediately use the content which is used lastly.

Here, the application program 32 may automatically write the content from the main body memory 30 to the IC memory 80 in order of descending the priority, the frequency of use or the time and date at which the content is used last time.

Here, the application program 32 may write not the saved content corresponding to the service code but the acquired content corresponding to the service code from the main body memory 30 to the IC memory 80.

As evidenced by the above description, various contents can be hold in the mobile communication terminal 100 regardless of the volume of data of the IC memory 80 according to the present embodiment. Additionally, a desired service can be immediately used by switching the memory location of contents between the IC memory 80 and the main body memory 30.

Here, in the above-described embodiments shown in FIG. 4-FIG. 6, the main body processor 20 activates the application program 32 and performs each operation according to the application program 32. However, the operation is not limited to that. Each operation is provided as a function i.e. firmware inherent in the mobile communication terminal, and the main body processor 20 may perform each operation according to the inherent function.

Additionally, in the above-described embodiments shown in FIG. 4-FIG. 6, the application program 32 saves the content to the main body memory 30 and writes the content saved to the main body memory 30 back to the IC memory 80. However, saving the content is not limited to that. The main body memory 30 stores information for identifying an external memory such as the content server 170, and the application program 32 may save the content selected by the operation section 42 among the contents displayed by the display section 40 from the IC memory 80 to the external memory by communicating directly or through the network with the external device of the main body memory 30, which is identified by the information. Further, in this case, the application program 32 may acquire the content from the external memory by communicating directly or through the network with the external memory of the main body memory 30, which is identified by the information and write the same back to the IC memory 80 when a predetermined condition is satisfied. Thereby various contents can be held in the mobile communication terminal 100 regardless of the volume of data of the IC memory 80 of the noncontact IC 90. Moreover, the memory location of content is switched between the noncontact IC 90 and the external memory, so that a desired service can be immediately used.

While the present invention has been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. A mobile communication terminal comprising a noncontact IC being capable of directly reading/writing a content from an external reader/writer and a terminal body that holds the noncontact IC, wherein
the terminal body including:
a main body processor that controls an operation of the terminal body and reads/writes the content stored in the noncontact IC;
a display section that displays the content stored in the noncontact IC;
an operation section that receives a selection of the content displayed on the display section; and
a main body memory that stores therein data processed by the main body processor,
the main body processor saves the content selected by the operation section among the contents displayed on the display section from the noncontact IC to the main body memory, and writes the saved content back to the noncontact IC when a predetermined condition is satisfied, and
receiving a request to write the content, the main body processor judges whether a free space of the noncontact IC is not enough to store the contact which has been required to be written, and judging that the free space of the noncontact IC is not enough to store the content which has been required to be written, the main body processor saves the content stored in the noncontact IC to the main body memory until the free space of the noncontact IC is more than the size of the content to be written.

2. The mobile communication terminal as set forth in claim 1, wherein
the operation section sets the priority of the content stored in the noncontact IC, and
the main body processor saves the content from the noncontact IC to the main body memory in order of ascending the set priority.

3. The mobile communication terminal as set forth in claim 1, wherein
a history of use of the content is stored in the main body memory or the noncontact IC for each content, and
the main body processor judges the frequency of use of each content based on the history of use and saves the content from the noncontact IC to the main body memory in order of ascending the frequency of use.

4. The mobile communication terminal as set forth in claim 1, wherein
a history of use of the content is stored in the main body memory or the noncontact IC for each content, and
the main body processor reads the time and date at which each content is used last time from the history of use and saves the content from the noncontact IC to the main body memory in order of ascending the time and date at which the content is used last time.

5. A mobile communication terminal comprising a noncontact IC being capable of directly reading/writing a content from an external reader/writer and a terminal body that holds the noncontact IC, wherein
the terminal body including:
a main body processor that controls an operation of the terminal body and reads/writes the content stored in the noncontact IC;
a display section that displays the content stored in the noncontact IC;
an operation section that receives a selection of the content displayed on the display section; and
a main body memory that stores therein data processed by the main body processor,
the main body processor saves the content selected by the operation section among the contents displayed on the display section from the noncontact IC to the main body memory, and writes the saved content back to the noncontact IC when a predetermined condition is satisfied,
the main body processor detects to increase the free space in the noncontact IC, the display section, when the free space in the noncontact IC is increased, selectively displays the content fallen within the increased free space in the noncontact IC among the contents stored in the main body memory, and the main body processor writes from the main body memory back to the noncontact IC the content selected by the operation section among the contents fallen within the increased free space in the noncontact IC.

6. The mobile communication terminal as set forth in claim 5, wherein the main body processor stores an index of the content stored in the noncontact IC in the main body memory in association with each content, the display section displays the index for each content stored in the main body memory, and the main body processor, when any index is selected by the operation section, judges that the content stored in the main body memory in association with the selected index is selected.

7. The mobile communication terminal as set forth in claim 5, wherein the main body processor stores a copy of the content stored in the noncontact IC in the main body memory, the display section displays the copy of the content stored in the main body memory as the content stored in the noncontact IC, and the main body processor, when any copy of the contents displayed on the display section is selected as the content to be saved from the noncontact IC to the main body memory, saves the content by deleting the content which is the original of the copy stored in the noncontact IC from the noncontact IC while the selected copy is stored in the main body memory.

8. The mobile communication terminal as set forth in claim 5, wherein the operation section sets the priority of the content stored in the main body memory, and the main body processor writes the content from the main body back to the noncontact IC in order of descending the preset priority.

9. The communication terminal as set forth in claim 5, wherein a history of use of the content is stored in the main body memory or the noncontact IC for each content, and the main body processor judges a frequency of use of each content based on the history of use and writes the content from the main body memory back to the noncontact IC in order of descending the frequency of use.

10. The mobile communication terminal as set forth in claim 5, wherein a history of use of the content is stored in the main body memory or the noncontact IC for each content, and the main body processor reads a time and date at which each content is used last time and writes the content from the main body memory to the noncontact IC in order of descending the time and date at which the content is used last time.

11. The mobile communication terminal as set forth in claim 5, wherein the main body processor stores a service code for identifying a service using the content in the noncontact IC or the main body memory in association with each content, the noncontact IC, receiving any service code from an external reader/writer, transmits the service code to the main body processor, and the main body processor retrieves the content associated with the service code in the noncontact IC, retrieves the content associated with the service code in the main body memory when the content associated with the service code is not detected in the noncontact IC, and writes a detected content from the main body memory back to the noncontact IC when the content associated with the service code is detected in the main body memory.

12. The mobile communication terminal as set forth in claim 11, wherein the main body processor, when the content associated with the service code which is received by the noncontact IC is not detected in any of the noncontact IC and the main body memory, acquires the content associated with the service code from outside and writes a content code unique to the acquired content to at least the noncontact IC.

13. The mobile communication terminal as set forth in claim 11, wherein the main body processor stores a specific function to acquire the content in association with the service code in the main body memory, and the main body processor, when the content associated with the service code received by the noncontact IC is not detected in any of the noncontact IC and the main body memory, executes the specific function associated with the service code to acquire the content and writes the same in the noncontact IC.

14. The mobile communication terminal as set forth in claim 5, wherein the main body processor stores a service code for identifying a service using the content in the noncontact IC or the main body memory in association with each content, the noncontact IC, receiving any service code from an external reader/writer, transmits the service code to the main body processor, and the main body processor retrieves the content associated with the service code in the noncontact IC, and when the content associated with the service code is not detected in the noncontact IC, the main body processor acquires the content associated with the service code from outside and writes a content code unique to the acquired content to at least the noncontact IC.

15. The mobile communication terminal as set forth in claim 14, wherein the main body processor stores a specific function to acquire the content in association with the service code in the main body memory, and the main body processor retrieves the content associated with the service code in the main body memory, and the main body processor retrieves the content associated with the service code in the noncontact IC, and when the content associated with the service code is not detected in the noncontact IC, the main body processor executes the specific function associated with the service code to acquire the content and writes the same to the noncontact IC.

16. A program for a mobile communication terminal comprising a noncontact IC being capable of directly reading/writing a content from an external reader/writer and a terminal body that holds the noncontact IC, the program causes the terminal body to perform as:

a main body processor function that controls an operation of the terminal body and reads/writes the content stored in the noncontact IC;

a display function that displays the content stored in the noncontact IC;

an operation function that receives a selection of the content displayed on the display section; and a main body memory function that stores therein data processed by the main body processor, the main body processor function saves the content selected by the operation section among the contents displayed on the display section from the noncontact IC to the main body memory, and writes the saved content back to the noncontact IC when a predetermined condition is satisfied,
wherein the main body processor function detects to increase the free space in the noncontact IC,
the display function, when the free space in the noncontact IC is increased, selectively displays the content fallen within the increased free space in the noncontact IC among the contents stored in the main body memory function, and
the main body processor function writes from the main body memory function back to the noncontact IC the content selected by the operation function among the contents fallen within the increased free space in the noncontact IC.

17. A mobile communication terminal comprising a noncontact IC being capable of directly reading/writing a content from an external reader/writer and a terminal body that holds the noncontact IC, wherein
the terminal body including:
a main body processor that controls an operation of the terminal body and reads/writes the content stored in the noncontact IC; and
a main body memory that stores therein data processed by the main body processor,
the main body processor stores a service code for identifying a service using the content in the noncontact IC or the main body memory in association with each content,
the noncontact IC, receiving any service code from an external reader/writer, transmits the service code to the main body processor, and
the main body processor retrieves the content associated with the service code received by the noncontact IC in the noncontact IC, retrieves the content associated with the service code in the main body memory when the content associated with the service code is not detected in the noncontact IC, and writes a detected content from the main body memory to the noncontact IC when the content associated with the service code is detected in the main body memory.

18. The mobile communication terminal as set forth in claim 17, wherein the main body processor, when the content associated with the service code which is received by the noncontact IC is not detected in any of the noncontact IC and the main body memory, acquires the content associated with the service code from outside and writes a content code unique to the acquired content to at least the noncontact IC.

19. The mobile communication terminal as set forth in claim 17, wherein
the main body processor stores a specific function for acquiring the content in association with the service code in the main body memory, and
the main body processor, when the content associated with the service code which is received by the noncontact IC is not detected in any of the noncontact IC and the main body memory, executes the specific function associated with the service code to acquire the content and writes the same to the nonconnect IC.

20. A program for a mobile communication terminal comprising a noncontact IC being capable of directly reading/writing a content from an external reader/writer and a terminal body that holds the noncontact IC, the program causes the terminal body to perform as:
a main body processor function that controls an operation of the terminal body and reads/writes the content stored in the noncontact IC; and
a main body memory function that stores therein data processed by the main body processor,
the main body processor function stores a service code for identifying a service using the content in the noncontact IC or the main body memory in association with each content, and
the main body processor retrieves the content associated with the service code received by the noncontact IC in the noncontact IC, retrieves the content associated with the service code in the main body memory when the content associated with the service code is not detected in the noncontact IC, and writes a detected content from the main body memory to the noncontact IC when the content associated with the service code is detected in the main body memory.

21. A mobile communication terminal comprising a noncontact IC being capable of directly reading/writing a content from an external reader/writer and a terminal body that holds the noncontact IC, wherein
the terminal body including:
a main body processor that controls an operation of the terminal body and reads/writes the content stored in the noncontact IC,
the main body processor stores a service core for identifying a service using the content in the noncontact IC in association with each content,
the noncontact IC, receiving any service code from an external reader/writer, transmits the service code to the main body processor, and
the main body processor retrieves the content associated with the service code received by the noncontact IC in the noncontact IC, and when the content associated with the service code is not detected in the noncontact IC, the main body processor acquires the content associated with the service code from outside and writes a content code unique to the acquired content to at least the noncontact IC.

22. The mobile communication terminal as set forth in claim 21, wherein
the terminal body further includes a main body memory that stores therein data processed by the main body processor,
the main body processor stores a specific function to acquire the content in association with the service code,
the main body processor retrieves the content associated with the service code received by the noncontact IC in the noncontact IC, and when the content associated with the service code is not detected in the noncontact IC, the main body processor executes the specific function associated with the service code to acquire the content and writes the same to the noncontact IC.

23. A program for a mobile communication terminal comprising a noncontact IC being capable of directly reading/writing a content from an external reader/writer and a terminal body that holds the noncontact IC, the program causes the terminal body to perform as:
a main body processor function that controls an operation of the terminal body and reads/writes the content stored in the noncontact IC;
the main body processor function stores a service core for identifying a service using the content in the noncontact IC in association with each content,
the noncontact IC, receiving any service code from an external reader/writer, transmits the service code to the main body processor, and
the main body processor function retrieves the content associated with the service code received by the noncontact IC in the noncontact IC, and when the content associated with the service code is not detected in the noncontact IC, the main body processor acquires the content associated with the service code from outside and writes a content code unique to the acquired content to at least the noncontact IC.

24. A mobile communication terminal comprising a noncontact IC being capable of directly reading/writing a content from an external reader/writer and a terminal body that holds the noncontact IC, wherein the terminal body including:
   a main body processor that controls an operation of the terminal body and reads/writes the content stored in the noncontact IC;
   a display section that displays the content stored in the noncontact IC;
   an operation section that receives a selection of the content displayed on the display section; and
   a main body memory that stores therein information for identifying an external memory which is disposed out of the terminal body,
the main body processor saves the content selected by the operation section among the contents displayed on the display section from the noncontact IC to the external memory by communicating with the external memory, and when a predetermined condition is satisfied, the main body processor acquires the saved content from the external memory by communicating with the external memory and writes the same back to the noncontact IC,
the main body processor detects to increase the free space in the noncontact IC,
the display section, when the free space in the noncontact IC is increased, selectively displays the content fallen within the increased free space in the noncontact IC among the contents stored in the main body memory, and
the main body processor writes from the main body memory back to the noncontact IC the content selected by the operation section among the contents fallen within the increased free space in the noncontact IC.

25. A program for a mobile communication terminal comprising a noncontact IC being capable of directly reading/writing a content from an external reader/writer and a terminal body that holds the noncontact IC, the program causes the terminal body to perform as:
   a main body processor function that controls an operation of the terminal body and reads/writes the content stored in the noncontact IC;
   a display function that displays the content stored in the noncontact IC;
   an operation function that receives a selection of the content displayed on the display section; and
   a main body memory function that stores therein information for identifying an external memory which is disposed out of the terminal body,
the main body processor function saves the content selected by the operation section among the contents displayed on the display section from the noncontact IC to the external memory by communicating with the external memory, and when a predetermined condition is satisfied, the main body processor acquires the saved content from the external memory by communicating with the external memory and writes the same back to the noncontact IC, wherein
the main body processor function detects to increase the free space in the noncontact IC,
the display function, when the free space in the noncontact IC is increased, selectively displays the content fallen within the increased free space in the noncontact IC among the contents stored in the main body memory function, and
the main body processor function writes from the main body memory function back to the noncontact IC the content selected by the operation function among the contents fallen within the increased free space in the noncontact IC.

* * * * *